United States Patent
Yano et al.

(10) Patent No.: US 10,678,484 B2
(45) Date of Patent: Jun. 9, 2020

(54) COMMUNICATION SYSTEM AND CONTROL METHOD

(71) Applicant: CANON KABUSHIKI KAISHA, Tokyo (JP)

(72) Inventors: Masaki Yano, Tokyo (JP); Noriyuki Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/522,538

(22) Filed: Jul. 25, 2019

(65) Prior Publication Data
US 2020/0034088 A1   Jan. 30, 2020

(30) Foreign Application Priority Data
Jul. 30, 2018   (JP) .................................. 2018-142387

(51) Int. Cl.
*G06F 3/12*   (2006.01)
(52) U.S. Cl.
CPC .......... *G06F 3/1207* (2013.01); *G06F 3/1243* (2013.01); *G06F 3/1272* (2013.01); *G06F 3/1287* (2013.01)
(58) Field of Classification Search
CPC .............................. G06F 3/1207; G06F 3/1243
See application file for complete search history.

(56) References Cited

U.S. PATENT DOCUMENTS

| | | | | |
|---|---|---|---|---|
| 2017/0187892 A1* | 6/2017 | Abe | ...................... | G06F 3/1208 |
| 2017/0223127 A1* | 8/2017 | Matsutani | ............... | H04L 67/26 |
| 2018/0131781 A1* | 5/2018 | Vangala | .................. | H04L 67/26 |

FOREIGN PATENT DOCUMENTS

JP   2017-134628 A   8/2017

\* cited by examiner

*Primary Examiner* — Ibrahim Siddo
(74) *Attorney, Agent, or Firm* — Canon U.S.A., Inc. IP Division

(57) ABSTRACT

To provide a communication system in which a notification about first output data is not made at a predetermined timing after the first output data is generated if a print product based on the first output data and a print product based on second output data are not output at the predetermined timing and a time when the second output data is edited last is later than a time when the first output data is edited last and the notification about the first output data is made at the predetermined timing if the print product based on the first output data and the print product based on the second output data are not output at the predetermined timing and the time when the second output data is edited last is earlier than the time when the first output data is edited last.

20 Claims, 12 Drawing Sheets

COMMUNICATION SYSTEM AND CONTROL METHOD

BACKGROUND

Field of the Disclosure

The present disclosure relates to a communication system and a control method.

Description of the Related Art

Methods are known in which notification information is externally received and a notification screen is displayed based on the notification information by a terminal apparatus. Japanese Patent Laid-Open No. 2017-134628 describes a mobile terminal apparatus that receives a push notification from a push notification delivery server and performs an announcing process to announce the push notification.

Systems are known in which a terminal apparatus is operated to edit output data used for outputting a print product and output the print product based on the output data. Users who use such systems may include users who do not perform the output after editing the output data, for example, because the users forget to perform an output operation, although the users have an intention to output the print product. A notification about the edited output data is desirably made to such a user. Making the notification about the output data prompts the user to output the print product. However, making the notification about the output data corresponding to the print product that is less likely to be output beyond necessity is troublesome for the user.

Accordingly, there is a need to appropriately make a notification about edited output data.

SUMMARY

According to an embodiment of the present disclosure, a control method for a communication system including a terminal apparatus that edits a plurality of pieces of output data for outputting a print product in which a layout image in which an image is arranged in a template is printed out and a server system includes, first editing a first piece of output data in the plurality of pieces of output data based on an input from a user, second editing a second piece of output data in the plurality of pieces of output data based on an input from the user, transmitting at least one of first notification information for making a notification about the first piece of output data and second notification information for making a notification about the second piece of output data, and making the notification about the first piece of output data upon reception of the first notification information and making the notification about the second piece of output data upon reception of the second notification information. If a print product based on the first piece of output data and a print product based on the second piece of output data are not output at a predetermined timing after the first piece of output data is generated and a time when the second piece of output data is edited last is later than a time when the first piece of output data is edited last, the notification about the first piece of output data is not made at the predetermined timing. If the print product based on the first piece of output data and the print product based on the second piece of output data are not output at the predetermined timing and the time when the second piece of output data is edited last is earlier than the time when the first piece of output data is edited last, the notification about the first piece of output data is made at the predetermined timing.

Further features of the present disclosure will become apparent from the following description of exemplary embodiments with reference to the attached drawings.

DESCRIPTION OF THE EMBODIMENTS

Figure 1:
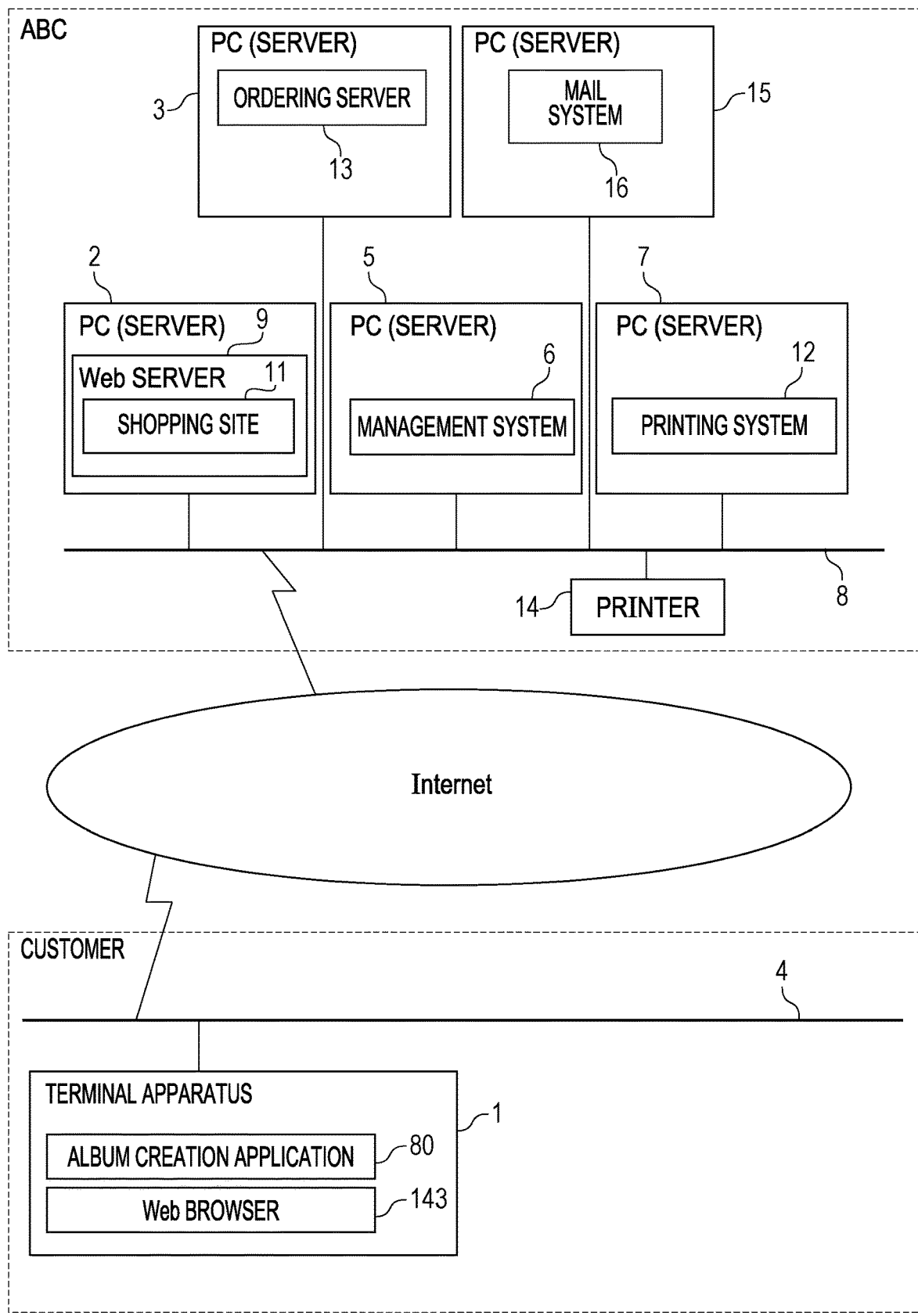
FIG. 1 illustrates an exemplary configuration of a photo album creating-ordering system according to a first embodiment.

Embodiments of the present disclosure will herein be described in detail with reference to the drawings. The embodiments described below are not intended to limit the present disclosure according to the claims and all the combinations of features described in the embodiments are not necessarily essential to resolutions of the present disclosure. The same reference numerals are used to identify the same components in the following description and a description of such components is omitted herein.

First Embodiment

FIG. 1 illustrates an exemplary configuration of a communication system (an album ordering system) according to an embodiment. Referring to FIG. 1, PCs 2, 3, 5, 7, and 15 are information processing apparatuses and are composed of, for example, general personal computers or a server. A terminal apparatus 1 may be an apparatus of any kind, such as a personal digital assistant (PDA), a mobile phone, a smartphone, a personal computer, or a digital camera, as long as the apparatus is capable of processing applications. The terminal apparatus 1 is capable of being connected to a mobile telephone network or a wireless local area network (LAN) router for Internet connection.

Album Ordering System

The terminal apparatus 1 is an apparatus possessed by a user and includes an photo album creation application 80 (hereinafter referred to as an album creation application 80). Installing the album creation application 80 enables the terminal apparatus 1 to edit album data. The album creation application 80 is composed of, for example, a smartphone application. A Web browser application 143 (hereinafter referred to as a Web browser 143) is a browser used when the user uses World Wide Web (WWW). A network 4 to which the terminal apparatus 1 belongs is connected to a network 8 to which the PCs 2, 3, 5, 7, and 15, and so on belong via the Internet. Accordingly, communication is available between the respective apparatuses belonging to the network 4 and the network 8.

The PC 2 includes a Web server 9 capable of providing Web sites. A shopping site 11 is one Web site provided by the Web server 9. The user is capable of ordering an album using the shopping site 11.

The PC 3 includes an ordering server 13 that detects acceptance of an order of an album from the user.

The PC 5 includes a management system 6 that manages information about the album data which the user is editing, information about the album data which the user has uploaded, and information about the album which the user has ordered.

The PC 7 includes a printing system 12 that manages printing of an album that is ordered.

The PC 15 includes a mail system 16 used to transmit a mail to the user.

A printer 14 prints out an album which the user has ordered.

First, the user edits the album data used for creating an album using the album creation application 80 on the terminal apparatus 1. The terminal apparatus 1 transmits information about the content of editing of the album data to the PC 5 each time the album data is edited. The management system 6 on the PC 5 manages the information about the album data which the user is editing.

When the editing is completed, the user orders an album. Specifically, the terminal apparatus 1 uploads the edited album data to the PC 5. Then, the terminal apparatus 1 accesses the shopping site 11 using the Web browser 143 to order the album based on the uploaded album data via the shopping site 11.

Upon acceptance of the order of the album from the user via the shopping site 11, the Web server 9 transmits order-related information (a name, an address, a telephone number, a delivery address, information used for identifying the ordered album data, and so on) about the order to the ordering server 13 on the PC 3.

The PC 3, which has detected the acceptance of the order through reception of the order-related information, transmits the order-related information to the management system 6 on the PC 5. The ordering server 13 and the management system 6 may function on the same PC.

The PC 5 receives and temporarily stores the album data uploaded from the album creation application 80 using the management system 6 and manages the album data in association with the order-related information received from the PC 3 as order information. Then, the PC 5 transmits the order information to the printing system 12 on the PC 7.

Upon reception of the order information, the PC 7 converts the album data into print data for printing out an album with the printer 14 using the printing system 12. The print data includes a print ticket on which print settings and so on are described and a portable document format (PDF) file, which is print image data. The PC 7 transmits the print data subjected to the conversion to the printer 14. The printer 14 performs printing based on the received print data to create the album. The PC 7 manages the status (waiting for printing, printed, delivered, or the like) of the album based on the received order information and a delivery ticket number (tracking number) for tracking the delivery status of the delivered album. The PC 7 appropriately transmits such information to the management system 6 on the PC 5.

The PC 5 receives the information about the status of the album and the delivery ticket number using the management system 6 and updates the status of each piece of order information which the PC 5 manages. In addition, the PC 5 transmits the information about the status of the album and the delivery ticket number to the shopping site 11 on the PC 2. Upon reception of the information about the status of the album and the delivery ticket number, the shopping site 11 accesses the mail system 16 on the PC 15 to cause the mail system 16 to transmit a mail for notifying the user of the information about the status of the album and the delivery ticket number.

The user is capable of ordering the album in the above manner. After ordering the album, the album created by the printer 14 is delivered to the user.

The example is described in the first embodiment in which the PC 2, the PC 3, the PC 5, the PC 7, the PC 15, and the printer 14 are connected to each other via the network 8. However, the first embodiment is not limited to this example. For example, the PC 2, the PC 3, the PC 5, the PC 7, the PC 15, and the printer 14 may be connected to each other via the Internet.

The PC 2, the PC 3, the PC 5, the PC 7, and the PC 15 are composed of one server in the first embodiment, the first embodiment is not limited to this mode. Multiple servers may cooperatively operate to build a server system corresponding to the PC 2, the PC 3, the PC 5, the PC 7, the PC 15. Alternatively, the functions performed by multiple servers, among the PC 2, the PC 3, the PC 5, the PC 7, the PC 15, may be performed on one server.

External Appearance of Terminal Apparatus 1

Figure 2:
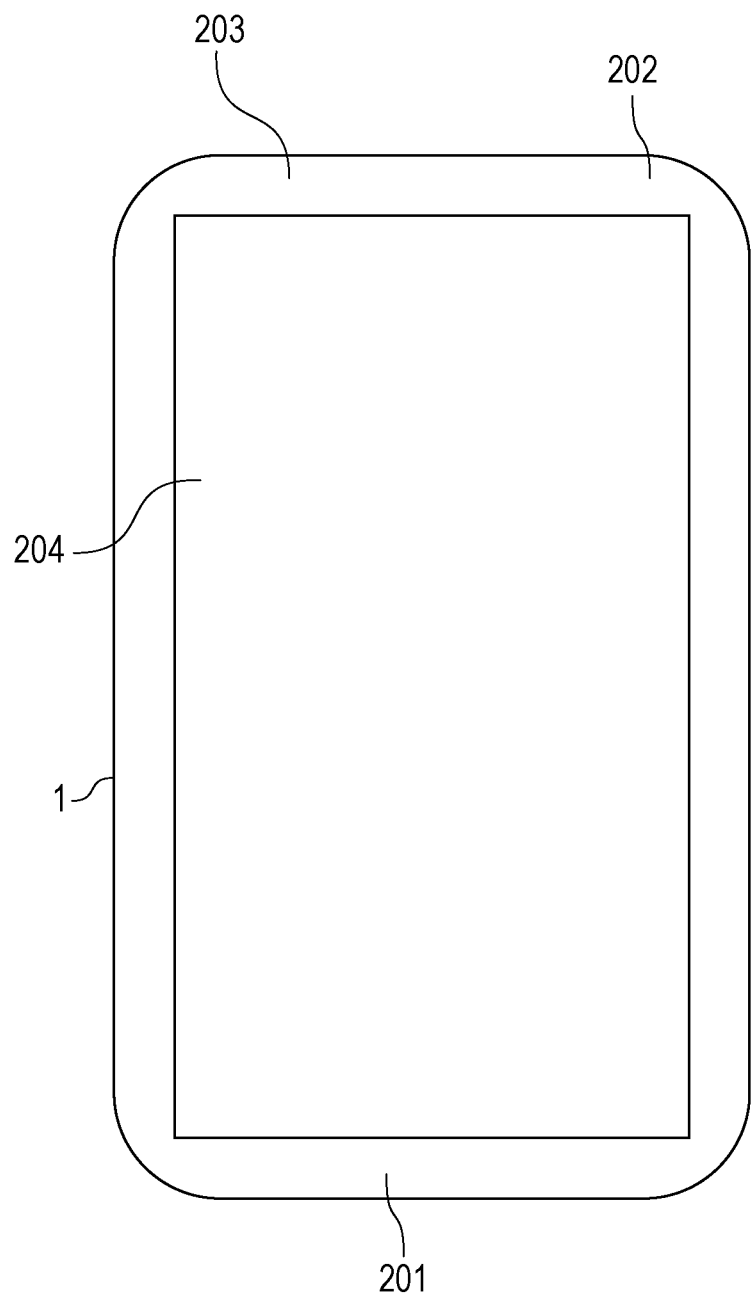
FIG. 2 illustrates an external appearance of a terminal apparatus.

FIG. 2 illustrates an external appearance of the terminal apparatus 1. In the first embodiment, a smartphone is exemplified. The smartphone is a multifunctional mobile phone having the camera function, the network browser function, the mail function, and so on, in addition to the function of the mobile phone. The terminal apparatus 1 includes units described below.

A near field communication (NFC) unit 201 performs short-range wireless communication. The NFC unit 201 is capable of communication when the user brings the NFC unit 201 close to a target NFC unit within a predetermined distance (about 10 cm). In other words, the terminal apparatus 1 is capable of performing the short-range wireless communication. The short-range wireless communication performed by the terminal apparatus 1 is not limited to the NFC communication. For example, the short-range wireless communication may be Bluetooth Classic (registered trademark), Bluetooth Low Energy (BLE) (registered trademark), Wi-Fi Aware (registered trademark), or the like.

A wireless LAN unit 202 has the function of Wireless Local Area Network (WLAN) (Wi-Fi (registered trademark) function) conforming to IEEE 802.11 standard series. The wireless LAN unit 202 may perform direct peer-to-peer communication with a target apparatus using a Wi-Fi Direct function or a soft AP function or may communicate with the target apparatus via an external access point or the like.

A line connection unit 203 performs Internet communication using a mobile communication network. For example, a communication standard, such as Long Term Evolution (LTE) or 4G, is used for the Internet communication.

A panel unit 204 is a display (display unit) provided with, for example, a liquid crystal display (LCD) display mechanism. The panel unit 204 is provided with a touch panel operation mechanism and detects information about depression by the user. Specifically, the panel unit 204 displays a user interface (UI), such as a button icon or a software keyboard, and detects depression of the UI by the user. The terminal apparatus 1 performs a certain function based on an event issued by an operation on the UI by the user.

Internal Configuration of Each Apparatus

Figure 3:
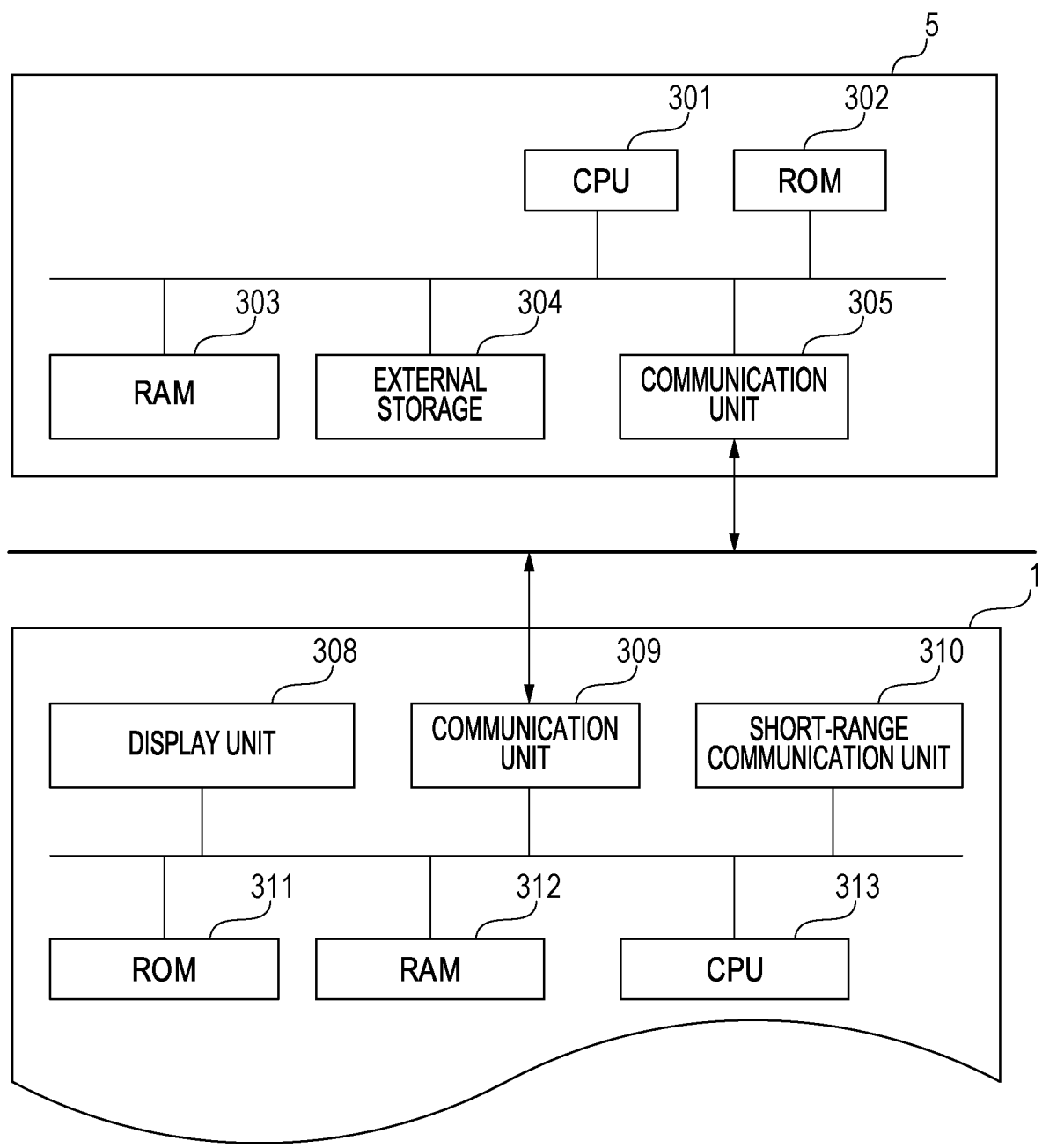
FIG. 3 illustrates exemplary hardware configurations of the terminal apparatus and an information processing apparatus.

Hardware configurations of the PC 5 and the terminal apparatus 1 will now be described with reference to a block diagram in FIG. 3.

The PC 5 includes a central processing unit (CPU) 301, a read only memory (ROM) 302, a random access memory (RAM) 303, an external storage 304, a communication unit 305, and so on. The CPU 301, the ROM 302, and so on compose the computer of the PC 5.

The CPU 301 is a system control unit and controls the entire PC 5.

The ROM 302 stores control programs executed by the CPU 301, a data table, and fixed data, such as an operating system (OS) program. In the first embodiment, each control program stored in the ROM 302 performs software execution control, such as scheduling, task switching, and interrupt processing, under the control of a built-in OS stored in the ROM 302.

The RAM 303 is composed of, for example a static RAM (SRAM) requiring a backup power supply. Since data is held in the RAM 303 with a data backup primary battery (not illustrated), the RAM 303 is capable of storing important data, such as program control variables, without volatilization. In addition, a memory area in which setup information about the PC 5, management data about the PC 5, and so on are stored is also provided in the RAM 303. The RAM 303 is also used as a main memory and a working memory of the CPU 301.

The external storage 304 stores, for example, a program to make a push notification to the terminal apparatus 1 using a service providing server 20.

The communication unit 305 is a component to perform data communication with another apparatus. The communication unit 305 is capable of communication with another server, the terminal apparatus 1, and so on via the Internet.

The PC 5 may include multiple communication units for communication with other apparatuses using different communication methods.

The service providing server 20, the PC 2, the PC 3, the PC 7, and the PC 15 have the same configuration as that of the PC 5.

The terminal apparatus 1 includes a display unit 308, a communication unit 309, a short-range communication unit 310, a ROM 311, a RAM 312, a CPU 313, and so on. The CPU 313, the ROM 311, and so on compose the computer of the terminal apparatus 1.

The CPU 313 is a system control unit and controls the entire terminal apparatus 1.

The ROM 311 stores control programs executed by the CPU 313, a data table, and fixed data, such as an OS program. In the first embodiment, each control program stored in the ROM 311 performs software execution control, such as scheduling, task switching, and interrupt processing, under the control of a built-in OS stored in the ROM 311. The OS held by the ROM 311 is, for example, iOS provided by Apple Inc. or Android provided by Google LLC. In addition, the ROM 311 stores various programs including the album creation application 80 and a variety of information used by the programs.

The RAM 312 is composed of, for example, an SRAM requiring a backup power supply. Since data is held in the RAM 312 with a data backup primary battery (not illustrated), the RAM 312 is capable of storing important data, such as program control variables, without volatilization. In addition, a memory area in which setup information about the terminal apparatus 1, management data about the terminal apparatus 1, and so on are stored is also provided in the RAM 312. The RAM 312 is also used as a main memory and a working memory of the CPU 313.

The display unit 308 is composed of a light emitting diode (LED), an LCD, or the like and corresponds to the panel unit 204. The display unit 308 displays a variety of data and a screen based on notification information. An operation unit including numerical value input keys, a mode setting key, an Enter key, a Delete key, and a Power key may be provided on the display unit 308 to accept an input by the user via the display unit 308.

The communication unit 309 is a component to perform data communication with another apparatus and corresponds to the wireless LAN unit 202. For example, the communication unit 309 connects to an external apparatus, such as a wireless LAN router, to receive information from the PC 5 and so on via the Internet. The communication method used by the communication unit 309 is not limited to the wireless communication method and may be a wired communication method, such as universal serial bus (USB) or a wired LAN.

The short-range communication unit 310 is a component for short-range wireless connection with another apparatus and corresponds to the NFC unit 201. In the first embodiment, the communication unit 309 is capable of performing the communication at a speed higher than that of the short-range communication unit 310. The distance at which the communication unit 309 is capable of communication is longer than that at which the short-range communication unit 310 is capable of communication.

The terminal apparatus 1 may include, for example, a communication unit corresponding to the line connection unit 203, in addition to the communication unit 309 and the short-range communication unit 310.

How to Order Album

In the first embodiment, the user edits the album data using the album creation application 80 on the terminal apparatus 1 and orders an album based on the edited album data, as described above. In addition, in the first embodiment, the album creation application 80 has an automatic layout function to automatically edit the album data based on images input by the user and present the edited album data to the user.

Figure 4A:
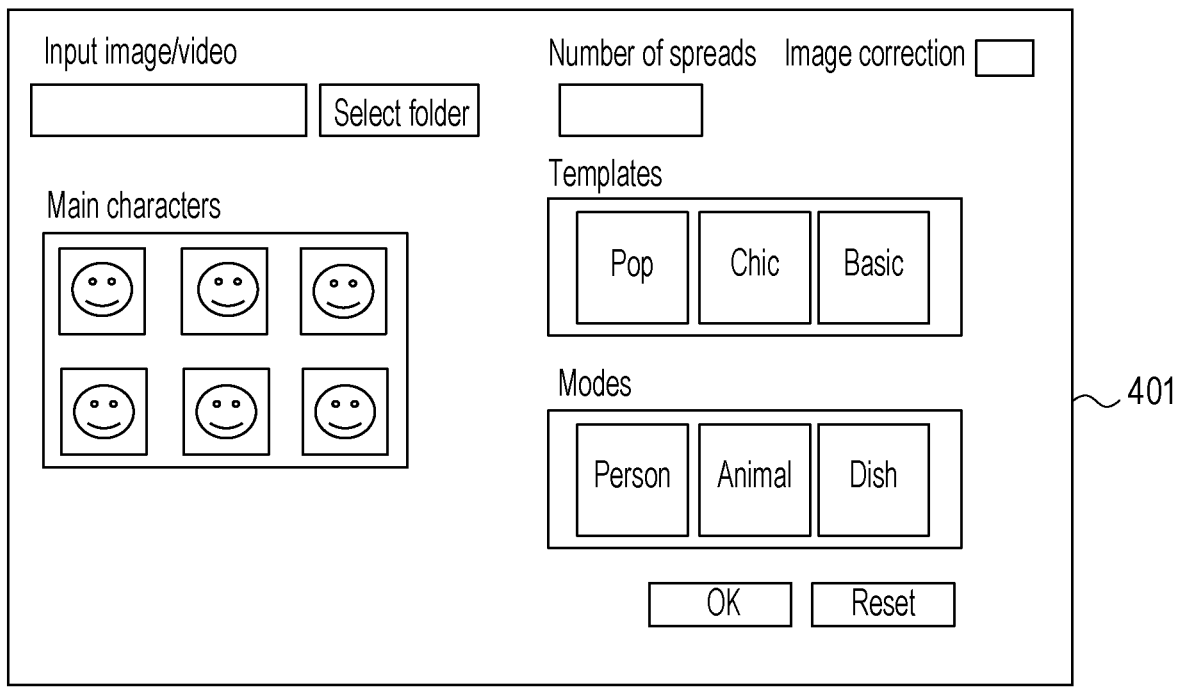
FIG. 4A, FIG. 4B, and FIG. 4C illustrate an exemplary setting screen, an exemplary editing screen, and an exemplary ordering screen, respectively.

FIG. 4A illustrates an exemplary setting screen displayed by the album creation application 80. A main screen 401 is used by the user to input setting information about the album data to be generated using the automatic layout function. The album creation application 80 accepts, for example, specification of album creation conditions from the user and performs an automatic layout process in accordance with the accepted creation conditions. The conditions to be specified include, for example, specifications of image data to be processed, an identifier (ID) of a main character, the number of spreads of the album, template information, ON and OFF conditions of image correction, ON and OFF conditions of use of video, an album mode, and so on. The image data may be specified using, for example, additional information or attribute information about each piece of image data, such as an image capturing date and time, or may be specified based on the structure of a file system including the image data, such as specification of a device or a directory (folder). The spread corresponds to one pair of pages that are printed on different sheets (or pages) and that are adjacent to each other.

In the album creation application 80 of the first embodiment, the layout of one spread is created on one display window.

Figure 4B:
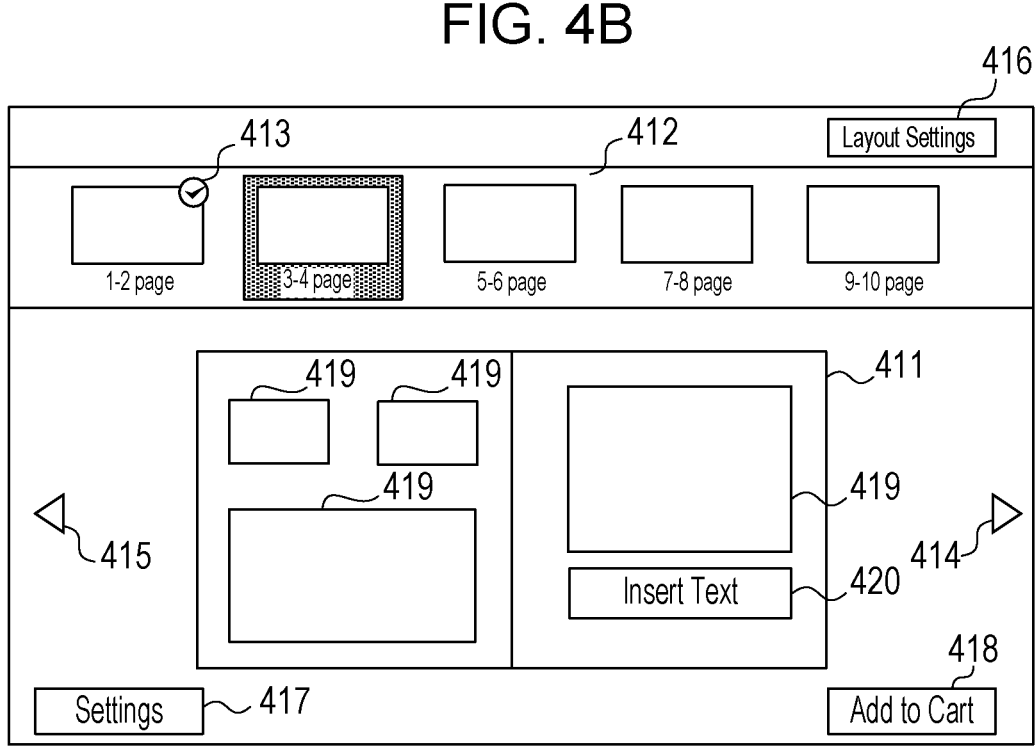

FIG. 4B illustrates an exemplary editing screen displayed by the album creation application 80. A display area 411 represents one spread. Here, one spread indicates an area corresponding to two pages that are opposed to each other in the album. Since one template corresponds to one spread in the first embodiment, one template and images arranged in the template are displayed in the display area 411. Although the relationship between a cover and a back cover does not correspond to the above definition of the spread, the cover and the back cover are considered to be one spared and the cover and the back cover are displayed in parallel to each other in the display area 411 in the first embodiment. The display area 411 is not limited to the mode representing one spread and may adopt a mode representing one page. In the display area 411, a state representing one spread and a state representing one page may be switched. In this case, for example, in the display area 411, the cover and the back cover are displayed in the state representing one page and the main body is displayed in the state representing one spread.

Slots 419 are of the spread displayed in the display area 411. A text box 420 is an area of the spread displayed in the display area 411 and a text is capable of being in put in the text box 420.

A thumbnail area 412 is an area in which a list of thumbnails corresponding to the respective spreads of the album is displayed. Upon selection of a thumbnail by the user, the spread corresponding to the selected thumbnail is displayed in the display area 411. In other words, the user is capable of selecting a thumbnail to browse the spread corresponding to the selected thumbnail.

An icon 413 indicates that the spread corresponding to the thumbnail has not been browsed. The terminal apparatus 1 of the first embodiment is capable of prompting the user to confirm the spread that has not been browsed by the user by adding the icon to the thumbnail corresponding to the spread that has not been browsed by the user in the above manner. Since prompting the user to confirm the spread is not necessary for the spread that has been browsed by the user (the browsed spread), no icon is displayed for the browsed spread.

Spread feed buttons 414 and 415 are used to switch the spread displayed in the display area 411. When the spread feed button 414 is pressed, the spread previous to the spread that is being displayed in the display area 411 is displayed. When the spread feed button 415 is pressed, the spread subsequent to the spread that is being displayed in the display area 411 is displayed. As described above, the user is capable of switching the spread displayed in the display area 411 by operating the spread feed buttons 414 and 415, instead of the method of selecting a thumbnail in the thumbnail area 412.

An album editing button 416 is used to change the settings concerning the entire album. Specifically, for example, the album editing button 416 is used to change the background color of the entire album, the font used in the entire album, the theme of the entire album, and so on. The entire album indicates all the spreads and pages included in the album. In other words, the user is capable of collectively performing the editing and change concerning the entire album by pressing the album editing button 416. The change of the settings concerning all the spreads and pages included in the album may not necessarily be performed with the album editing button 416 and it is sufficient to perform the change of the settings concerning at least one spread or page with the album editing button 416.

In the first embodiment, when the album editing button 416 is pressed, a screen to accept an input to change the settings concerning the entire album is displayed on the foreside of the editing screen.

A spread editing button 417 is used to change the settings concerning the spread displayed in the display area 411. Specifically, for example, the spread editing button 417 is used to change the template corresponding to the spread, the images included in the spread, and the importance level of the spread and to add and input a text. The settings concerning the spread displayed in the display area 411 may be changed by directly operating the slots 419 or the text box 420.

A shopping cart addition button 418 is used to add the album based on the album data displayed on the editing screen to a shopping cart on the Web. When the shopping cart addition button 418 is pressed, the album data having the settings when the shopping cart addition button 418 is pressed is uploaded to the PC 5. Then, access to a specific Web site (the shopping site 11) where the album is ordered is made with the Web browser 143 and an ordering screen is displayed. Then, the album based on the album data that is edited on the editing screen is added to the shopping cart managed on the Web.

The user is capable of editing the album data displayed in FIG. 4B through input onto the screen in FIG. 4B. Specifically, the user is capable of changing the images and/or the template arranged on a layout image corresponding to the album data displayed in FIG. 4B or adding or changing the text in the layout image. In addition, for example, the user is capable of changing the binding method, the material, the number of pages, and so on of the album based on the album data displayed in FIG. 4B.

Figure 4C:
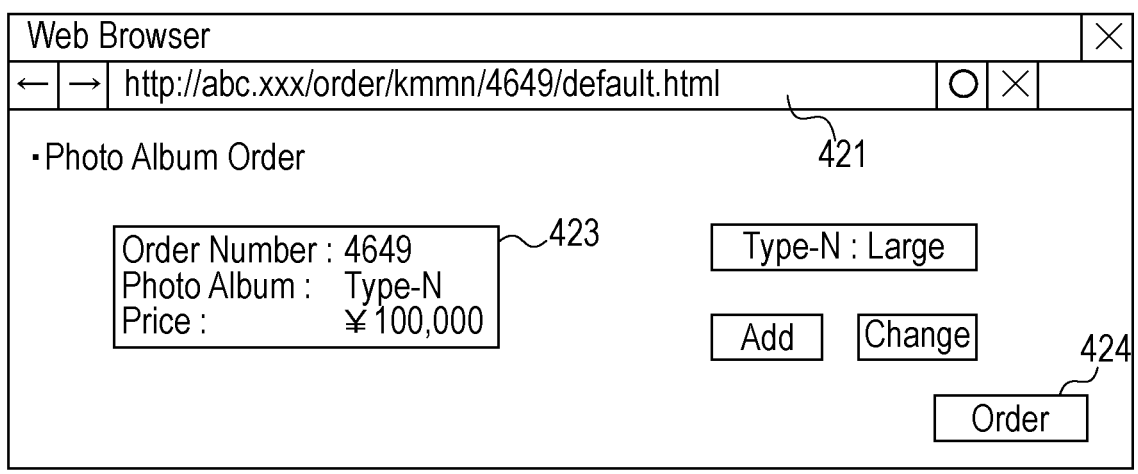

FIG. 4C illustrates an exemplary ordering screen displayed by the Web browser 143. The uniform resource locator (URL) of a Web site that is being displayed on the Web browser 143 is displayed in a URL setting portion 421. The content (the price, the album type, the order number, and so on) of the album added to the shopping cart is displayed in a content-of-order display portion 423. When an Order button 424 is pressed, the album added to the shopping cart is ordered. In response to this, the terminal apparatus 1 transmits the order-related information to the PC 2 including the shopping site 11 and the PC 2 transfers the order-related information to the PC 5. Upon transfer of the order-related information, the management system 6 on the PC 5 identifies the order of the album.

Figure 5:
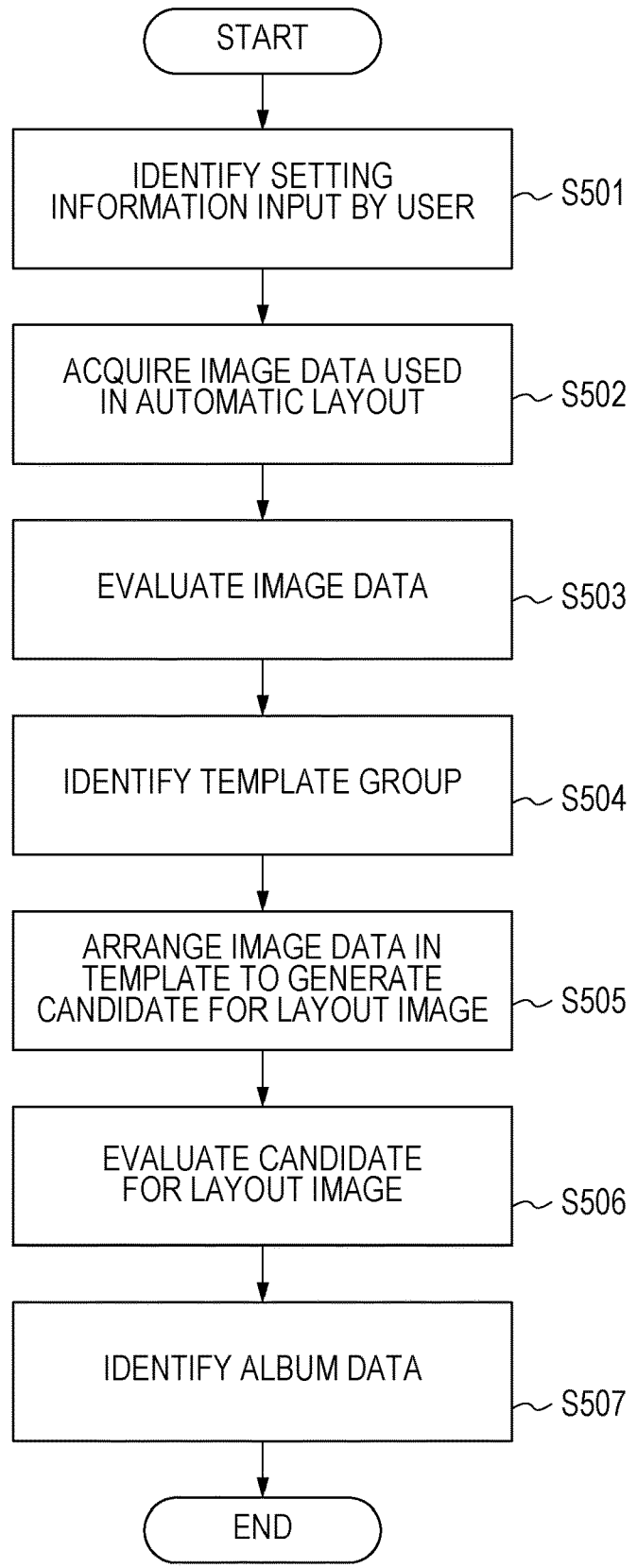
FIG. 5 is a flowchart illustrating an automatic layout process.

FIG. 5 is a flowchart illustrating the automatic layout process performed by the album creation application 80 when an album creation button is pressed. The flowchart illustrated in FIG. 5 is realized by, for example, the CPU 313 that reads out the program that is stored in the memory in the terminal apparatus 1 and that corresponds to the album creation application 80 into the RAM 312 and executes the program that is read out. The flowchart illustrated in FIG. 5 is started when an automatic layout instruction button is pressed on the screen displayed by the album creation application 80.

Referring to FIG. 5, in Step S501, the CPU 313 identifies the setting information indicating the album creation conditions, which is accepted from the user via the setting screen illustrated in FIG. 4A or the like.

In Step S502, the CPU 313 acquires the image data included in a storage area to be searched. The storage area to be searched is capable of being set on, for example, the setting screen (for example, a server name box) illustrated in FIG. 4A, like the settings concerning acquisition of video data. For example, the memory in the terminal apparatus 1, a server, a social networking service (SNS), or the like is set as the storage area to be searched. The image data acquired here may include the image data acquired by cutting out frames from video data.

In Step S503, the CPU 313 evaluates the image data acquired in Step S502 (scoring). Specifically, the CPU 313 evaluates the image data based on feature quantities, such as the number of face images, the positions of the face images, and the sizes of the face images, in each piece of image data that is collected.

Figure 6:
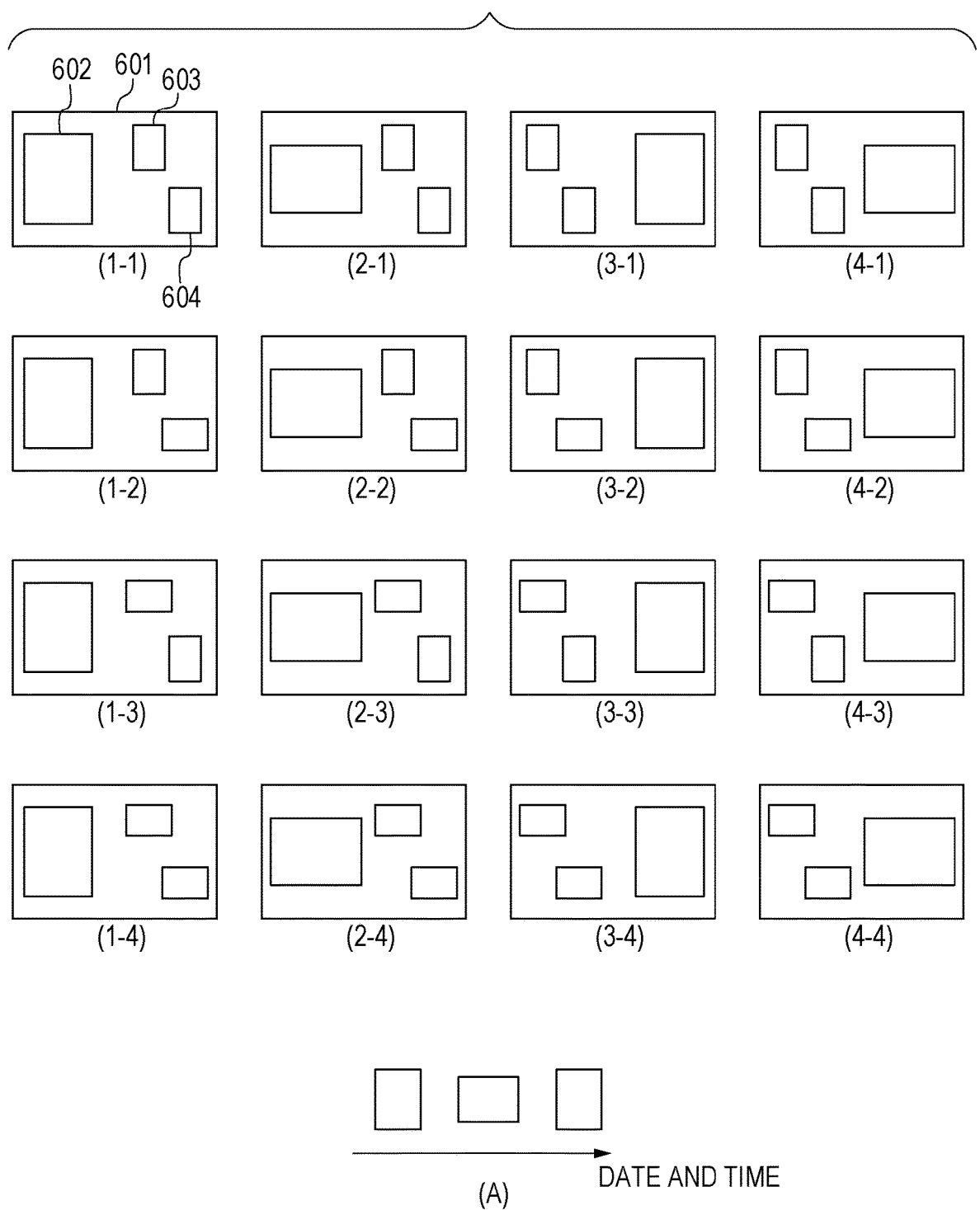
FIG. 6 illustrates an exemplary template group.

In Step S504, the CPU 313 identifies a template group for generating the layout image. FIG. 6 illustrates an example of the template group including multiple templates in which images are arranged. Each of the multiple templates included in the template group corresponds to one spread. A template 601 is one template. A main slot 602 indicates a main slot. Sub-slots 603 and 604 indicate sub-slots. The main slot 602 is the main slot in the template 601 (the slot is a frame in which images are laid out (arranged)) and is larger than the sub-slots 603 and 604. Images represented by the image data classified into scenes of the same kind may be laid out in one template or images represented by the image data classified into scenes of different kinds may be laid out in one template.

In Step S505, the CPU 313 arranges the images based on the evaluation in Step S503 in the template identified in Step S504 to generate a candidate for the layout image.

In Step S506, the CPU 313 evaluates the candidate for the layout image generated in Step S505. Here, the candidate for the layout image is evaluated based on the feature quantities or the score of each piece of image data or the feature quantities (the number of slots, the positions of the slots, the slot sizes, or the like) of each template.

In Step S507, the CPU 313 identifies the layout image highly evaluated in Step S506 as part of the album data.

Each layout image in each page included in the album is automatically generated to generate one piece of album data in the above manner. In other words, the terminal apparatus 1 is capable of automatically selecting the images to be arranged and the template using the automatic layout function without accepting a selection instruction from the user to automatically generate the layout image. The layout image generated in the above manner is displayed on the editing screen.

The album based on the album data, which is ordered by the user, is a print product in which the multiple layout images that are generated and edited in the above manner are printed.

Push Notification System

Figure 7:
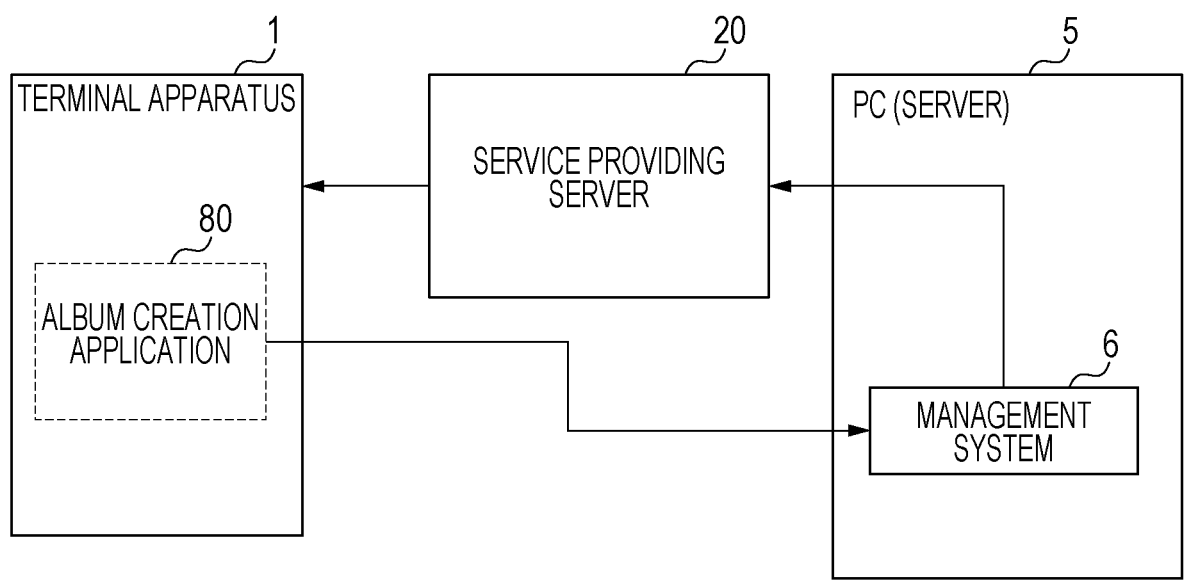
FIG. 7 illustrates an exemplary configuration of a push notification system.

The push notification is a notification method to make a notification to the terminal apparatus 1 using a push notification service. FIG. 7 illustrates an exemplary configuration of a push notification system of the first embodiment. This system includes the terminal apparatus 1, the PC 5, and a push notification service providing server (hereinafter referred to as the service providing server) 20.

The PC 5 notifies the terminal apparatus 1 via the service providing server 20 of the information (the notification information) about the album that is being edited by the user using the album creation application 80 operating on the terminal apparatus 1 and the album that is ordered based on notification conditions described below. The PC 5 may transmit the notification information to the multiple terminal apparatuses 1 in order to display the information in the multiple apparatuses.

The terminal apparatus 1 displays the information based on the notification information transmitted from the service providing server 20. The album creation application 80 in the terminal apparatus 1 has a function to analyze the notification information transmitted from the service providing server 20 and notify the OS of the result of analysis to cause the OS to display a message based on the notification information.

The information included in the notification information may be data that is encrypted using a security key shared between the PC 5 and the album creation application 80. Alternatively, the information included in the notification information may be binary data, text data, such as UTF-8 data, or data that is encoded using, for example, a Base64 method.

The service providing server 20 provides the push notification service. In the first embodiment, since the OS has a push notification function to display a notification area in the display unit using the push notification, it is necessary to use the push notification service corresponding to each OS in order to use the push notification function. In other words, it is necessary for the PC 5 to transmit the notification information to the terminal apparatus 1 via the service providing server 20, instead of direct transmission of the notification information to the terminal apparatus 1. The push notification service that is used is varied depending on the OS of the terminal apparatus 1, which receives the notification using the push notification. Specifically, the PC 5 transmits the notification information to the terminal apparatus 1 via the service providing server 20 that is varied depending on the OS of the terminal apparatus 1 to which the notification is transmitted using the push notification. For example, since the push notification service corresponding to iOS provided by Apple Inc. is Apple Push Notification service (APNs), the service providing server 20 for APNs is used when the OS of the terminal apparatus 1 is iOS. Since the push notification service corresponding to Android provided by Google LLC. is Firebase Cloud Messaging (FCM), the service providing server 20 for FCM is used when the OS of the terminal apparatus 1 is Android. The communication between the service providing server 20 and the terminal apparatus 1 is one-way communication in which active access is available only from the service providing server 20 side.

Although the service providing server 20 is composed of one server in the first embodiment, the first embodiment is not limited to this mode. Multiple servers may cooperatively operate to build a server system corresponding to the service providing server 20.

Push Notification

In the first embodiment, the PC 5 notifies the terminal apparatus 1 of the information about the album data which the user is editing with the album creation application 80 using the push notification. Specifically, when a predetermined time period elapses since the user has generated and edited the album data without ordering the album based on the album data, the PC 5 notifies the terminal apparatus 1 of the information about the album data. With this notification, the user is capable of recognizing that the album data is still in an editing state and that the order of the album is not completed.

Figure 8A:
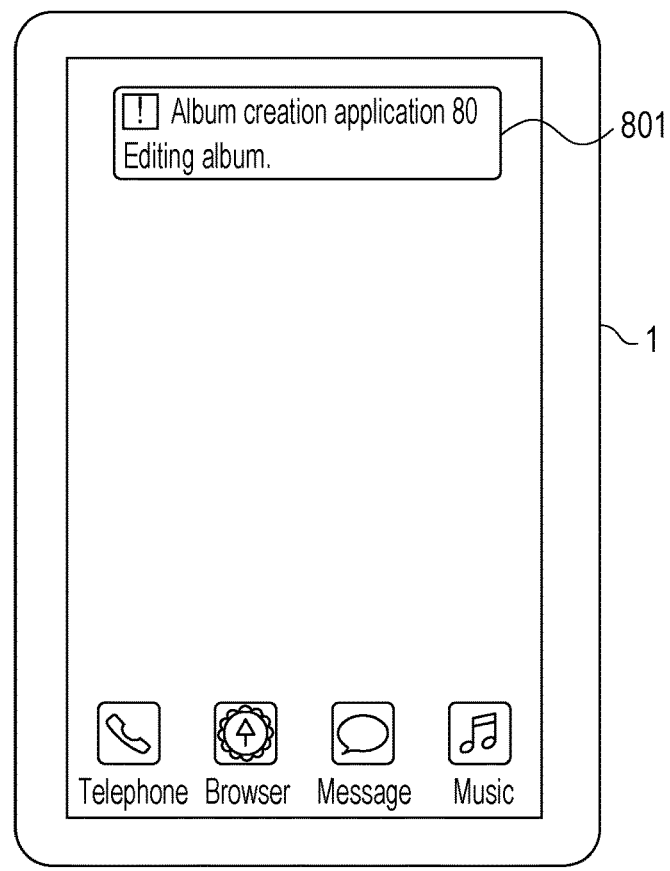
FIG. 8A and FIG. 8B illustrate exemplary screens in a state in which a notification area is being displayed.

In the first embodiment, in the push notification to the terminal apparatus 1, the PC 5 transmits the notification information about the album data to the terminal apparatus 1 via the service providing server 20. Upon acceptance of the notification information, the terminal apparatus 1 newly displays the notification area for indicating a message corresponding to the notification information on the screen displayed in the display unit 308. FIG. 8A illustrates an example of the screen in a state in which the notification area is being displayed with the push notification function. A notification area 801 indicates the notification area concerning the album data. The name of the application (the album creation application 80 here) corresponding to the notification area 801 and the content of the notification based on the notification information are included in the notification area 801. The content included in the notification area is, for example, the content for indicating that the album data is in the editing state or the content prompting the user to order the album. Identification information (the album name, the file name, or the like) to identify the album data in the editing state may be included in the notification area.

In the first embodiment, the push notification function to display the notification area in the display unit using the push notification is realized by the OS in the terminal apparatus 1. The push notification function is a function to enable transmission of the notification to the album creation application 80 even in a state in which the album creation application 80 is not started up on the terminal apparatus 1. In other words, with the push notification function, the terminal apparatus 1 is capable of displaying the notification area 801 even in a state in which the album creation application 80 operates in the background, in a state in which the album creation application 80 is not started up, or in a state in which a home screen is displayed.

Figure 8B:
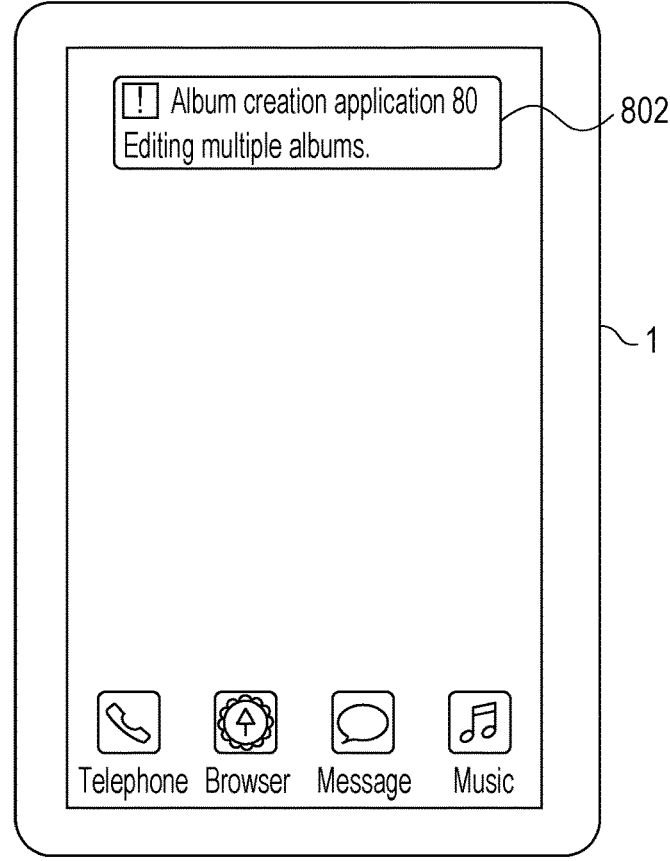

Although the notification indicating that one piece of album data is being edited is made by the notification area 801 in the example in FIG. 8A, a notification indicating that multiple pieces of album data are being edited may be made by a notification area 802, as illustrated in FIG. 8B.

Although the user is capable of recognizing the information about the album data using the push notification, making the push notification beyond necessity is troublesome for the user.

Accordingly, in the first embodiment, a condition to perform the push notification is set and the push notification is controlled so as not to be performed beyond necessity to inhibit the user from feeling that the push notification is troublesome for the user. Specifically, in the first embodiment, the notification is made when the album data is in the editing state and the notification is not made when the album data is in an uploaded state, an ordered state, or a deleted state. The editing state is a state in which, although the album data has been generated or edited, the uploading or the ordering is not performed. The uploaded state is a state in which, although the album data has been uploaded, the ordering is not performed. The ordered state is a state in which the album corresponding to the album data is ordered. The deleted state is a state in which the album data is deleted.

Figure 9:
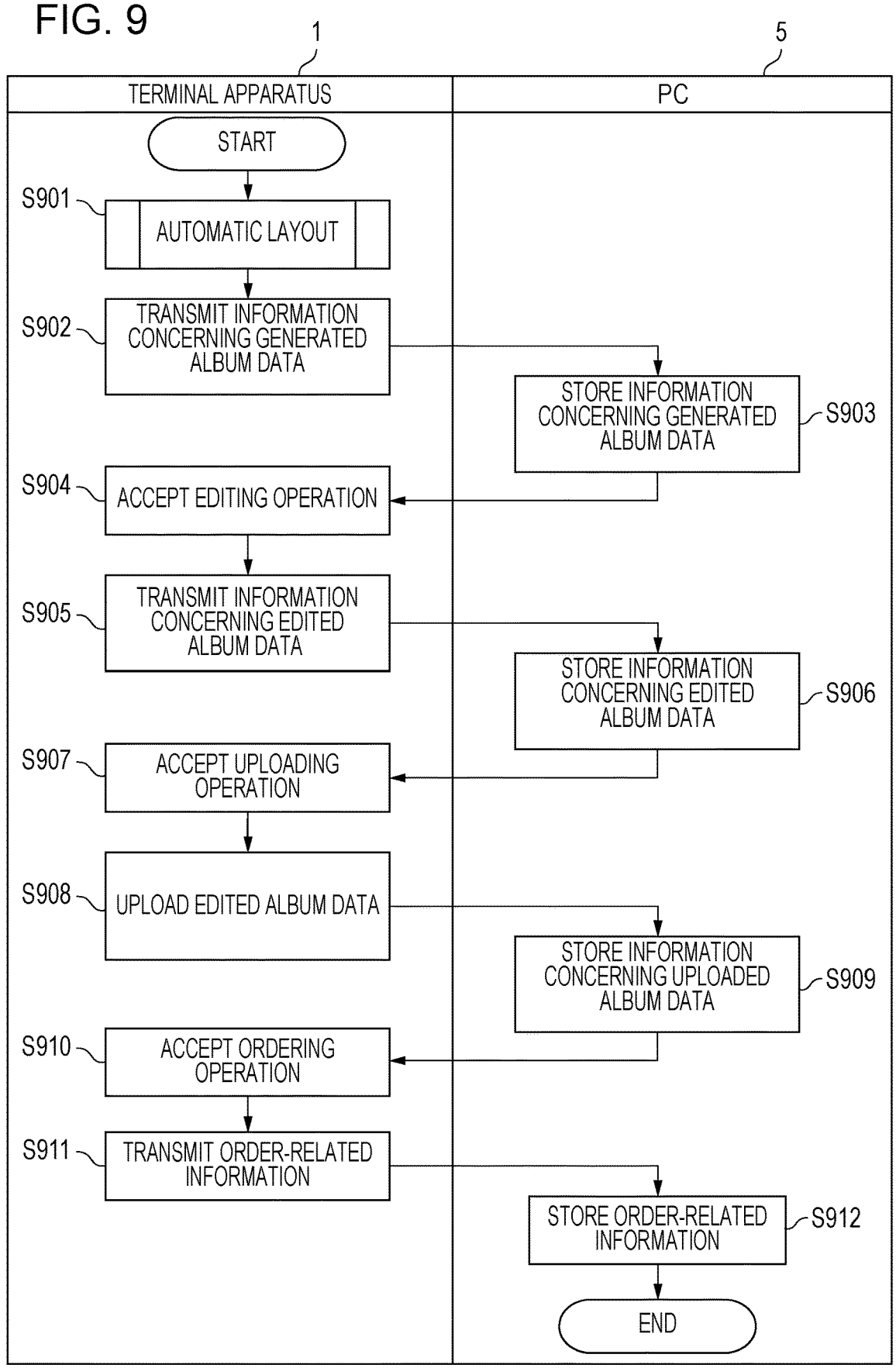
FIG. 9 is a flowchart illustrating an exemplary process performed by each apparatus in editing of album data.

FIG. 9 is a flowchart illustrating an exemplary process performed by each apparatus in the editing of the album data. The process illustrated in the flowchart in FIG. 9 is realized by, for example, the CPU in each apparatus, which reads out the program that is stored in the memory in each apparatus into the RAM in each apparatus and executes the program that is read out. In the flowchart illustrated in FIG. 9, Steps S901, S902, S904, S905, S907, and S908 performed by the terminal apparatus 1 are performed by the album creation application 80. Steps S910 and S911 performed by the terminal apparatus 1 are performed by the Web browser 143. Steps performed by the PC 5 are performed by the management system 6. The flowchart in FIG. 9 is started after the album data is automatically generated using the automatic layout function.

Referring to FIG. 9, in Step S901, the terminal apparatus 1 generates the album data using the automatic layout function. This process is described above in detail in the flowchart illustrated in FIG. 5.

In Step S902, the terminal apparatus 1 transmits the information (the name of the album data, information about the date and time when the album data is generated, and so on) about the album data generated using the automatic layout function and the identification information about the terminal apparatus 1 to the PC 5 via the Internet.

In Step S903, the PC 5 stores and manages the information about the album data generated using the automatic layout function. The PC 5 stores and manages date-and-time information about the date and time when the user's operation is performed in the album data and, at this time, the PC 5 stores and manages the information about the date and time when the album data is generated as the date-and-time information. Here, the album data is in the editing state.

In Step S904, the terminal apparatus 1 accepts an editing operation for the album data generated using the automatic layout function from the user. Then, the terminal apparatus 1 edits the album data in accordance with the accepted editing operation.

In Step S905, the terminal apparatus 1 transmits the information about the edited album data and the identification information about the terminal apparatus 1 to the PC 5 via the Internet in accordance with the result of editing in response to the editing operation accepted from the user. For example, when the editing operation accepted from the user is an operation to delete the album data, the terminal apparatus 1 transmits information for notifying the PC 5 of deletion of the album data, the identification information about the deleted album data, and so on to the PC 5.

In Step S906, the PC 5 stores and manages the information about the edited album data. Specifically, the PC 5 stores and manages information about the date and time when the album data is edited as the date-and-time information. Here, the album data is in the editing state. When the editing operation accepted from the user is an operation to delete the album data, the album data falls outside the scope of the PC 5. Specifically, the date-and-time information is changed to information indicating that the album data is to be deleted or that the album data has been deleted. Here, the album data is in the deleted state.

In Step S907, the terminal apparatus 1 accepts an operation to upload the edited album data from the user.

In Step S908, the terminal apparatus 1 uploads (transmits) the edited album data to the PC 5.

In Step S909, the PC 5 stores and manages the uploaded album data. In addition, the PC 5 stores and manages information about the date and time when the album data is uploaded as the date-and-time information. The PC 5 stores information indicating that the album data is uploaded in association with the album data. Here, the album data is in the uploaded state.

In Step S910, the terminal apparatus 1 accepts an operation to order the album based on the uploaded album data from the user.

In Step S911, the terminal apparatus 1 transmits the order-related information to the PC 3.

In Step S912, the PC 5 stores and manages the order-related information received from the PC 3. The PC 5 stores and manages information about the date and time when the album data is ordered as the date-and-time information. The PC 5 stores information indicating that the album data is ordered in association with the album data. Here, the album data is in the ordered state.

The editing of the album data and the management of the information about the album data are performed in the above manner. When the user wants to order multiple albums, multiple pieces of album data are capable of being generated with the album creation application 80. In this case, the PC 5 manages the information about the multiple pieces of album data which the terminal apparatus 1 is editing.

Although the flow from the time when the album data is generated using the automatic layout function to the time when the album based on the album data is ordered is described above, the process may be terminated on the way. In other words, the user may hold the album data that is being edited or may suspend the ordering of the album after the album data is uploaded. In this case, the album data managed by the PC 5 is still in the editing state or the uploaded state.

Figure 10:
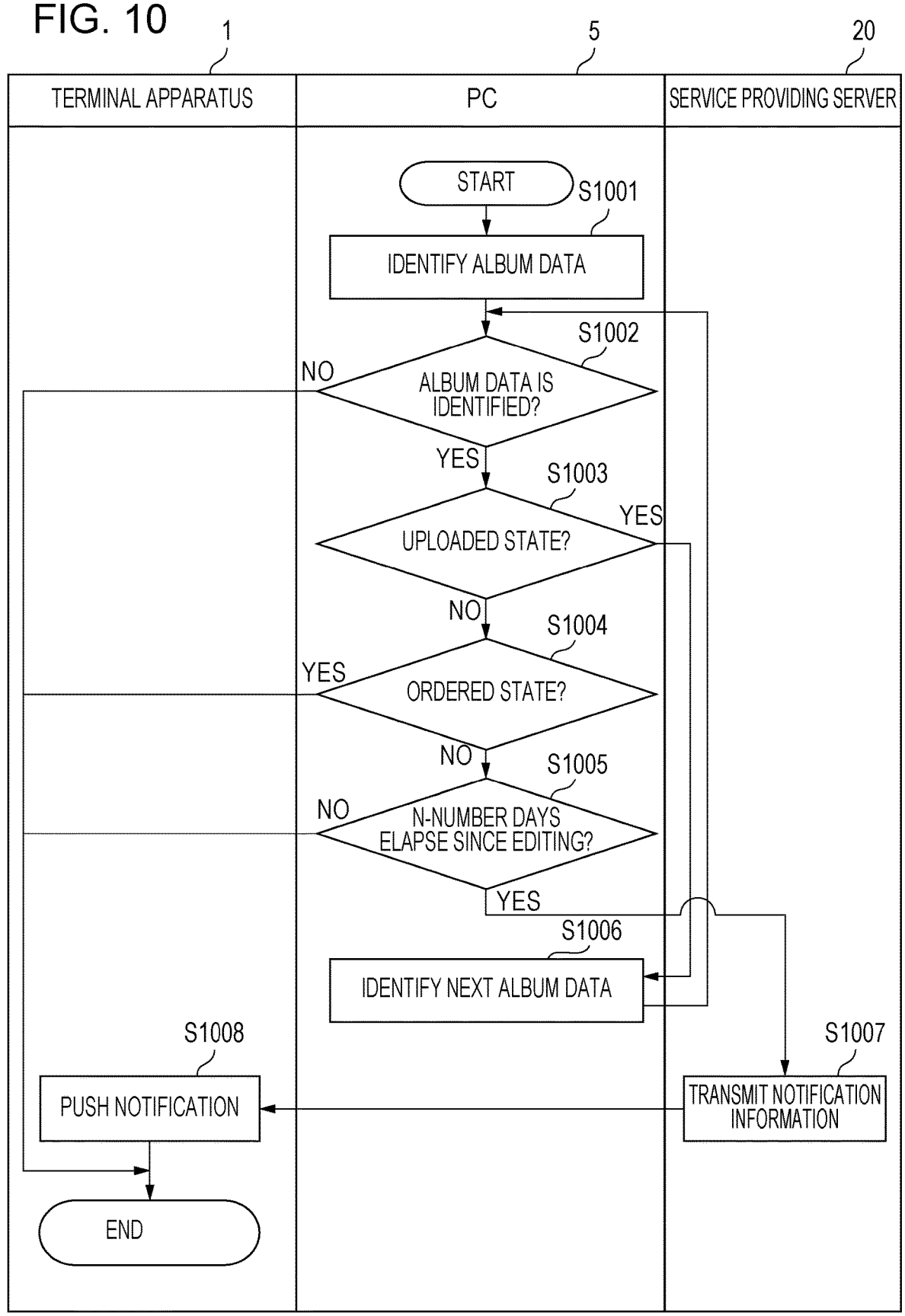
FIG. 10 is a flowchart illustrating an exemplary process performed by each apparatus in a notification process concerning the album data.

FIG. 10 is a flowchart illustrating an exemplary process performed by each apparatus in a notification process concerning the album data. The process illustrated in the flowchart in FIG. 10 is realized by, for example, the CPU in each apparatus, which reads out the program that is stored in the memory in each apparatus into the RAM in each apparatus and executes the program that is read out. In the flowchart in FIG. 10, the step performed by the terminal apparatus 1 is performed by the album creation application 80 and the steps performed by the PC 5 are performed by the management system 6.

Referring to FIG. 10, in Step S1001, the PC 5 identifies the album data the change (any of editing, uploading, and ordering) of which in response to an instruction from the user is performed last, in the pieces of album data managed by the PC 5. Specifically, the PC 5 identifies the album data having the latest date and time indicated by the date-and-time information with reference to the date-and-time information about each piece of album data managed by the PC 5. The deleted album data is not included in the album data managed by the PC 5. When the target album data does not exist, the PC 5 does not perform the identification of the album data.

In Step S1002, the PC 5 determines whether any album data is identified in Step S1001. If the result of determination is affirmative (YES in Step S1002), the process goes to Step S1003. If the result of determination is negative (NO in Step S1002), the process illustrated in FIG. 10 is terminated without making the push notification.

In Step S1003, the PC 5 determines whether the album data identified in Step S1001 is in the uploaded state. If the result of determination is affirmative (YES in Step S1003), the process goes to Step S1006. If the result of determination is negative (NO in Step S1003), the process goes to Step S1004. Specifically, in the first embodiment, the notification about the album data in the uploaded state is controlled so as not to be performed.

In Step S1004, the PC 5 determines whether the album data identified in Step S1001 is in the ordered state. If the result of determination is affirmative (YES in Step S1004), the process illustrated in FIG. 10 is terminated without making the push notification. Specifically, in the first embodiment, the notification about the album data in the ordered state is not performed. If the result of determination is negative (NO in Step S1004), the process goes to Step S1005. Specifically, in the first embodiment, the notification about the album data in the ordered state is controlled so as not to be performed. If the result of determination is affirmative (YES in Step S1004), the process may go to Step S1006. Specifically, another piece of album data may be newly identified and the notification about the other album data may be controlled so as to be performed.

If the result of determination in Step S1003 is negative and the result of determination in Step S1004 is negative, the album data identified in Step S1001 is in the editing state. In the first embodiment, the notification about the album data in the editing state is performed at a predetermined timing after the album data in the editing state is generated. Specifically, the predetermined timing is a timing when a predetermined time elapses since the date and time when the album data in the editing state is edited last. The predetermined time is an N-number days, where N is an integer that is capable of being arbitrarily set and is equal to 30 (N=30) in the first embodiment. Accordingly, in Step S1005, the PC 5 determines whether the N-number days elapse since the date and time when the album data identified in Step S1001 is edited last. If the result of determination is affirmative (YES in Step S1005), the PC 5 transmits the notification information about the album data identified in Step S1001 to the service providing server 20 in order to make the notification about the album data identified in Step S1001. Then, the service providing server 20 performs the processing in Step S1007. If the result of determination is negative (NO in Step S1005), the process illustrated in FIG. 10 is terminated without making the push notification. Specifically, in the first embodiment, if the N-number days do not elapse since the date and time when the album data in the editing state is edited last, the notification is controlled so as not to be performed. It is assumed that the album data in the editing state exists, other than the album data the change of which in response to an instruction from the user is performed last (the album data having the latest editing date and time). It is also assumed that, when the flowchart in FIG. 10 is performed, the N-number days elapse since the date and time when the other album data is edited last. However, in the flowchart in FIG. 10, if the album data having the latest editing date and time is not uploaded, the determination of whether the N-number days elapse since the date and time when the other album data is edited last is not performed. Accordingly, the notification information about the album data other than the album data having the latest editing date and time is not transmitted even if the N-number days elapse since the date and time when the album data other than the album data having the latest editing date and time is edited last. In the above mode, it is possible to prompt the user to order the album by making the notification about the album data corresponding to the album which the user is likely to order (the album data having the latest editing date and time). In addition, it is possible to inhibit the user from feeling that the notification is troublesome for the user because the notification about the album data corresponding to the album which the user is less likely to order (the album data other than the album data having the latest editing date and time) is made. In Step S1005, the PC 5 may determine whether the number of days longer than or equal to the N-number days elapses since the date and time when the album data identified in Step S1001 is edited last. In this mode, the notification is capable of being made also in patterns illustrated in FIG. 11I and FIG. 11J described below. Although the notification about the album data in the editing state is made at the timing when the N-number days elapse since the date and time when the album data in the editing state is edited last in the first embodiment, the first embodiment is not limited to this mode and the notification may be made at an arbitrary timing.

In Step S1006, the PC 5 identifies the album data which has not been identified in the determination in Steps S1003 to S1005 and the change (editing) of which in response to an instruction from the user is performed last, in the album data which the terminal apparatus 1 is editing. Then, the process goes back to Step S1002 and the determination in Steps S1003 to S1005 is performed for the album data identified here. If the target album data does not exist, the PC 5 does not perform the identification of the album data.

In Step S1007, the service providing server 20 receives the notification information from the PC 5. Then, the service providing server 20 transmits the notification information to the terminal apparatus 1. At this time, the notification information received from the PC 5 may be converted in the service providing server 20 and the notification information resulting from the conversion may be transmitted to the terminal apparatus 1.

Upon reception of the notification information by the terminal apparatus 1 via the service providing server 20, the terminal apparatus 1 analyzes the notification information using the OS in the terminal apparatus 1. Since the notification information includes information about the application corresponding to the notification information, the OS in the terminal apparatus 1 identifies the application to which the received notification information corresponds. In the first embodiment, since the notification information corresponds to the album creation application 80, the OS in the terminal apparatus 1 supplies the notification information to the album creation application 80. The following step performed by the album creation application 80 in response to the reception of the notification information may be performed in a state in which the album creation application 80 does not operate in the foreground.

In Step S1008, the album creation application 80 in the terminal apparatus 1 causes the OS in the terminal apparatus 1 to newly display the notification area based on the notification information in the display unit 308. As a result, the notification area based on the notification information is newly displayed in the display unit 308.

FIGS. 11A to 11J are diagrams for describing the respective patterns that may occur when the control of the first embodiment is performed.

Figure 11A:
FIGS. 11A to 11J are diagrams for describing the respective patterns that may occur when control of the first embodiment is performed.

As illustrated in FIG. 11A, when the uploading of album data A and the ordering of the album based on the album data A are not performed after the album data A is edited, the notification about the album data A is made the N-number days after the album data A is edited.

Figure 11B:
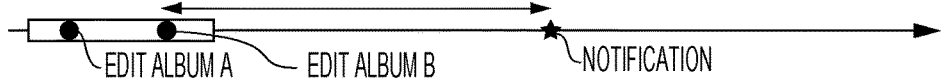

As illustrated in FIG. 11B, when album data B is edited after the album data A is edited and the uploading of the album data A and the album data B and the ordering of the albums based on the album data A and the album data B are not subsequently performed, the notification about the album data B is made the N-number days after the album data B is edited. In contrast, the notification about the album data A is not made the N-number days after the album data A is edited. As described above, in the first embodiment, the notification is made about the album data that is edited last, in the multiple pieces of album data in the editing state. In other words, the notification about the album data other than the album data that is edited last is not made the N-number days after the other album data (the album data A) is edited.

Figure 11C:
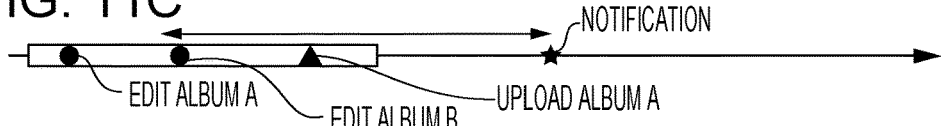

As illustrated in FIG. 11C, when the album data B is edited after the album data A is edited, the uploading of the album data A is subsequently performed, and the uploading of the album data B and the ordering of the album based on the album data B are not subsequently performed, the notification about the album data A is not made the N-number days after the album data A is edited, although the album data for which the instruction from the user is issued last is the album data A. In contrast, the notification about the album data B is made the N-number days after the album data B is edited.

Figure 11D:
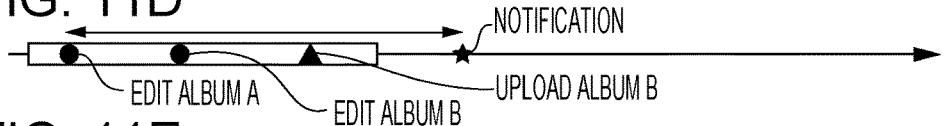

As illustrated in FIG. 11D, when the album data B is edited after the album data A is edited, the uploading of the album data B is subsequently performed, and the uploading of the album data A and the ordering of the album based on the album data A are not subsequently performed, the notification about the album data B is not made the N-number days after the album data B is edited, although the album data for which the instruction from the user is issued last is the album data B. In contrast, the notification about the album data A is made the N-number days after the album data A is edited. As described above, in the first embodiment, when the album data that is edited last is uploaded, the notification about the album data that is uploaded is not made and the notification about the album data that is edited before the uploaded album data is made.

Figure 11E:
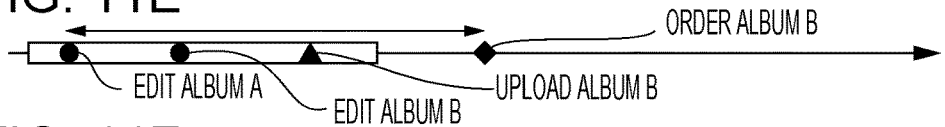

As illustrated in FIG. 11E, when the album data B is edited after the album data A is edited, the uploading of the album data B and the ordering of the album based on the album data B are subsequently performed, and no album data is subsequently edited, the notification about the album data A is not made even the N-number days after the album data A is edited. The notification about the album data B that is in the ordered state is not made even the N-number days after the album data B is edited. As described above, in the first embodiment, when the ordering of the album based on any album data is performed even if the album data in the editing state remains, the notification about any album data is not made unless the editing of the album data is subsequently performed. For example, also when the album data A is edited after the editing of the album data B and the uploading of the album data B are performed and the ordering of the album based on the album data B is subsequently performed, the notification about the album data A is not made even the N-number days after the album data A is edited unless the editing of any album data is performed.

Figure 11F:

As illustrated in FIG. 11F, when the album data B is edited after the album data A is edited, the uploading of the album data B and the ordering of the album based on the album data B are subsequently performed, the album data A is subsequently edited, and the uploading of the album data A and the ordering of the album based on the album data A are not performed, the notification about the album data A is made the N-number days after the album data A is edited.

Figure 11G:
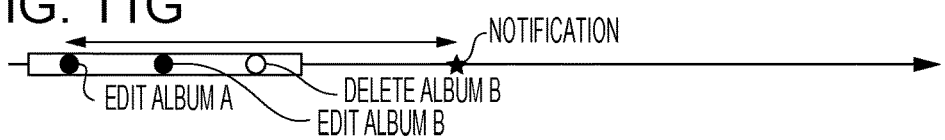

As illustrated in FIG. 11G, when the album data B is edited after the album data A is edited, the album data B is subsequently deleted, and the uploading of the album data A and the ordering of the album based on the album data A are not performed, the notification about the album data A is made the N-number days after the album data A is edited. As described above, in the first embodiment, when the album data that is edited last is deleted, the notification about the deleted album data is not made and the notification about the album data that is edited before the deleted album data is made.

Figure 11H:
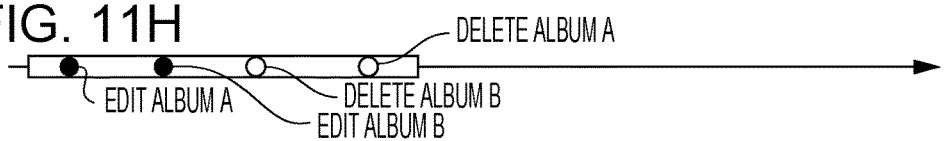

As illustrated in FIG. 11H, when the album data B is edited after the album data A is edited, the deletion of the album data A and the deletion of the album data B are subsequently performed, and no album data is subsequently edited, the notification about the album data is not made.

Figure 11I:
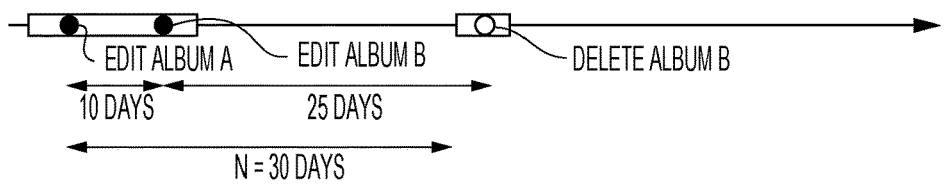

As illustrated in FIG. 11I, it is assumed that N=30. When the album data B is edited ten days after the album data A is edited and the album data B is deleted 25 days after the album data B is edited, 30 days or more elapses since the album data A is edited at the timing when the album data B is deleted. In this case, the notification about the album data A and the album data B is not made. The notification about album data A may be made after the album data B is deleted in this case.

Figure 11J:
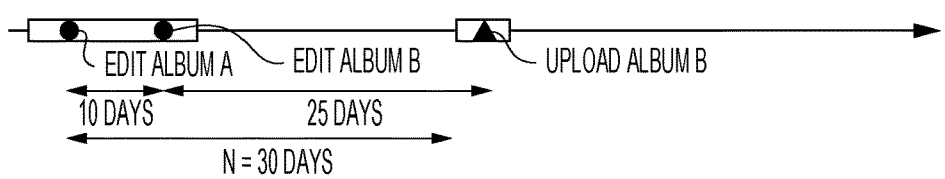

As illustrated in FIG. 11J, it is assumed that N=30. When the album data B is edited ten days after the album data A is edited and the album data B is uploaded 25 days after the album data B is edited, 30 days or more elapses since the album data A is edited at the timing when the album data B is uploaded. In this case, the notification about the album data A and the album data B is not made. The notification about album data A may be made after the album data B is uploaded in this case.

Although the mode is described above in which the notification is made only once the N-number days after the editing is performed, the first embodiment is not limited to this mode. A mode may be adopted in which the notification is made again when the N-number days elapses with no uploading and no ordering since the notification is made.

Other Embodiments

Although the mode is described in the first embodiment in which the notification about the information about the album data is made using the push notification, the first embodiment is not limited to this mode. For example, a mode may be adopted in which the notification about the information about the album data is made using a mail. In this case, for example, the identification information about the terminal apparatus 1 included in the notification information is the mail address for transmitting the mail to the terminal apparatus 1. The PC 5 does not transmit the notification information to the service providing server 20 but transmits the notification information to the mail system 16 on the PC 15. The notification about the information about the album data is made using the mail in the above manner.

Although the mode is described in the first embodiment in which the notification about the album data in the uploaded state is not made, the first embodiment is not limited to this mode. In other words, the notification about the album data in the uploaded state may be made. In addition, for example, a mode may be adopted in which the notification about the album data in the uploaded state is not made using the notification information transmitted from the communication system including the PC 5 but is made using the notification information transmitted from another communication system that does not include the PC 5.

In the first embodiment, whether the notification by the terminal apparatus 1 is made is controlled based on whether the PC 5 transmits the notification information. However, the first embodiment is not limited to this mode. For example, a mode may be adopted in which the PC 5 constantly transmits the notification information to the terminal apparatus 1 when the N-number days elapses since the date and time when the album data in the editing state is edited last and whether the terminal apparatus 1 makes the notification based on the received notification information is controlled depending on the state of each piece of album data. In this case, the terminal apparatus 1 also manages the information about each piece of album data.

Although the mode is described in the first embodiment in which, after the album data is generated and edited, the album based on the album data is ordered as an output of the album based on the album data, the first embodiment is not limited to this mode. For example, the album based on the album data may be printed out using a printing apparatus held by the user as an output of the album based on the album data. When the album based on the album data is not printed out using the printing apparatus, the notification about the album data may be made. In other words, the embodiments of the present disclosure are applicable to the communication system for outputting (ordering and printing out) the album based on the album data. Making the notification about the album data prompts the user to output the album based on the album data.

Although the notification about the album data is made in order to prompt the user to order the album based on the album data in the above embodiments, the embodiments are not limited to this mode. For example, a mode may be considered in which, when a predetermined time elapses since the album data is edited last, the album data is deleted. In such a mode, the notification about the album data is made in order to prompt the user to edit the album data. Accordingly, the content of the notification, included in the notification area, may follow the mode.

Although the mode is described in the above embodiments in which the print product is the album, the embodiments are not limited to this mode. It is sufficient for the print product to be a print product that is output based on the data edited by the terminal apparatus and the print product may be, for example, a poster, a postcard, a T-shirt, or a cup. In other words, although the mode is described in the above embodiments in which the album data for creating the album is edited, the embodiments are not limited to this mode. The data to be edited may be output data for outputting the print product.

In the above embodiments, the output data corresponding to the print product that is likely to be output is the output data that is edited last and the notification about the output data that is edited last is made. The output data corresponding to the print product that is less likely to be output is the output data other than the output data that is edited last and the notification about the output data other than the output data that is edited last is not made. However, the embodiments are not limited this mode. For example, the output data corresponding to the print product that is likely to be output is the output data that is edited last and the second last edited output data and the notification about the output data other than the above output data may be controlled so as not to be performed.

The above embodiments may be realized by performing the following process. Specifically, the software (programs) realizing the functions of the above embodiments may be supplied to a system or an apparatus via a network or various storage media and the computer (or the CPU or a micro processing unit (MPU)) in the system or the apparatus may read out the programs for execution. The programs may be executed by one computer or may be cooperatively executed by multiple computers. All the processes described above may not necessarily be realized by the software and part or all of the processes may be realized by hardware, such as an application specific integrated circuit (ASIC). In addition, one CPU may not necessarily perform all the processes and multiple CPUs may appropriately cooperatively perform the processes.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-142387, filed on Jul. 30, 2018, which is hereby incorporated by reference herein in its entirety.

What is claimed is:

1. A control method for a communication system including a terminal apparatus that edits a plurality of pieces of output data for outputting a print product and a server system, the control method comprising:
    first editing a first piece of output data in the plurality of pieces of output data based on an input from a user with the terminal apparatus;
    second editing a second piece of output data in the plurality of pieces of output data based on an input from the user with the terminal apparatus;
    transmitting at least one of first notification information for making a notification about the first piece of output data and second notification information for making a notification about the second piece of output data with the server system; and
    making the notification about the first piece of output data upon reception of the first notification information and making the notification about the second piece of output data upon reception of the second notification information with the terminal apparatus,
    wherein, if a print product based on the first piece of output data and a print product based on the second piece of output data are not output at a predetermined timing after the first piece of output data is generated and a time when the second piece of output data is edited last is later than a time when the first piece of output data is edited last, the notification about the first piece of output data is not made at the predetermined timing, and
    wherein, if the print product based on the first piece of output data and the print product based on the second piece of output data are not output at the predetermined timing and the time when the second piece of output data is edited last is earlier than the time when the first piece of output data is edited last, the notification about the first piece of output data is made at the predetermined timing.

2. The control method according to claim 1,
wherein, if the print product based on the first piece of output data and the print product based on the second piece of output data are not output at the predetermined timing, the time when the second piece of output data is edited last is later than the time when the first piece of output data is edited last, and the second piece of output data is deleted, the notification about the first piece of output data is made at the predetermined timing.

3. The control method according to claim 1,
wherein, if the print product based on the first piece of output data is not output and the print product based on the second piece of output data is output at the predetermined timing and the print product based on the second piece of output data is output after the time when the first piece of output data is edited last, the notification about the first piece of output data is not made at the predetermined timing.

4. The control method according to claim 1,
wherein, if the print product based on the first piece of output data is not output and the print product based on the second piece of output data is output at the predetermined timing and the print product based on the second piece of output data is output before the time when the first piece of output data is edited last, the notification about the first piece of output data is made at the predetermined timing.

5. The control method according to claim 1,
wherein the print product based on the first piece of output data and the print product based on the second piece of output data are output after the first piece of output data and the second piece of output data are uploaded to a certain server, and
wherein, if the first piece of output data is not uploaded and the second piece of output data is uploaded at the predetermined timing and the second piece of output data is uploaded after the time when the first piece of output data is edited last, the notification about the first piece of output data is made at the predetermined timing.

6. The control method according to claim 1,
wherein the predetermined timing is a timing when a predetermined time elapses since the time when the first piece of output data is edited last.

7. The control method according to claim 1,
wherein, if the print product based on the first piece of output data and the print product based on the second piece of output data are not output at the predetermined timing, the first piece of output data and the second piece of output data are not deleted, the time when the second piece of output data is edited last is later than the time when the first piece of output data is edited last, and the second piece of output data is deleted at a specific timing after the predetermined timing, the notification about the first piece of output data is not made at the specific timing.

8. The control method according to claim 1,
wherein the notification about the first piece of output data is controlled so as not to be made by not transmitting the first notification information to the terminal apparatus, and wherein the notification about the first piece of output data is controlled so as to be made by transmitting the first notification information to the terminal apparatus.

9. The control method according to claim 8,
wherein a notification indicating that any of the plurality of pieces of output data is edited is transmitted to the server system each time the any of the plurality of pieces of output data is edited, and
wherein whether the first notification information is transmitted to the terminal apparatus is controlled based on the notification.

10. The control method according to claim 8,
wherein a notification indicating that the print product corresponding to any of the plurality of pieces of output data is output is transmitted to the server system each time the print product corresponding to the any of the plurality of pieces of output data is output, and
wherein whether the first notification information is transmitted to the terminal apparatus is controlled based on the notification.

11. The control method according to claim 1,
wherein the print product is an album and the output data is album data for creating the album.

12. The control method according to claim 1,
wherein the print product is a print product in which a layout image in which an image is arranged in a template is printed out.

13. The control method according to claim 12, further comprising:
automatically selecting at least one template from a plurality of templates without accepting a selection instruction from the user; and
automatically selecting at least one piece of image data from a plurality of pieces of image data without accepting a selection instruction from the user,
wherein, in the layout image, an image represented by the selected image data is arranged in a slot on the selected template.

14. The control method according to claim 12,
wherein the editing of the first piece of output data is changing of at least one of the template included in the layout image corresponding to the first piece of output data and the image arranged in the template included in the layout image corresponding to the first piece of output data, and
wherein the editing of the second piece of output data is changing of at least one of the template included in the layout image corresponding to the second piece of output data and the image arranged in the template included in the layout image corresponding to the second piece of output data.

15. The control method according to claim 1,
wherein the notification about the first piece of output data is displaying of a notification screen including information about the first piece of output data.

16. The control method according to claim 1,
wherein the notification about the first piece of output data is a notification indicating that the first piece of output data is not output.

17. The control method according to claim 1,
wherein the outputting of the print product based on the first piece of output data and the outputting of the print product based on the second piece of output data are ordering of the print product based on the first piece of output data and ordering of the print product based on the second piece of output data, respectively.

18. The control method according to claim 1,
wherein the server system is composed one server or a plurality of servers.

19. A communication system including a terminal apparatus that edits a plurality of pieces of output data for outputting a print product and a server system,
wherein the terminal apparatus includes
a first editing unit that edits a first piece of output data in the plurality of pieces of output data based on an input from a user, and
a second editing unit that edits a second piece of output data in the plurality of pieces of output data based on an input from the user,
wherein the server system includes
a transmission unit that transmits at least one of first notification information for making a notification about information about the first piece of output data and second notification information for making a notification about information about the second piece of output data,
wherein the terminal apparatus includes
a notification unit that makes a notification about the first piece of output data upon reception of the first notification information and makes a notification about the second piece of output data upon reception of the second notification information,
wherein, if a print product based on the first piece of output data and a print product based on the second piece of output data are not output at a predetermined timing after the first piece of output data is generated and a time when the second piece of output data is edited last is later than a time when the first piece of output data is edited last, the notification about the first piece of output data is not made at the predetermined timing, and
wherein, if the print product based on the first piece of output data and the print product based on the second piece of output data are not output at the predetermined timing and the time when the second piece of output data is edited last is earlier than the time when the first piece of output data is edited last, the notification about the first piece of output data is made at the predetermined timing.

20. A control method for a terminal apparatus that edits a plurality of pieces of output data for outputting a print product, the control method comprising:
editing a first piece of output data in the plurality of pieces of output data based on an input from a user;
editing a second piece of output data in the plurality of pieces of output data based on an input from the user; and
making a notification about the first piece of output data upon reception of first notification information for making the notification about the first piece of output data and making a notification about the second piece of output data upon reception of second notification information for making the notification about the second piece of output data,
wherein, if a print product based on the first piece of output data and a print product based on the second piece of output data are not output at a predetermined timing after the first piece of output data is generated and a time when the second piece of output data is edited last is later than a time when the first piece of output data is edited last, the notification about the first piece of output data is not made at the predetermined timing, and wherein, if the print product based on the first piece of output data and the print product based on the second piece of output data are not output at the predetermined timing and the time when the second piece of output data is edited last is earlier than the time when the first piece of output data is edited last, the notification about the first piece of output data is made at the predetermined timing.

\* \* \* \* \*